US007431783B2

(12) United States Patent
Capron

(10) Patent No.: US 7,431,783 B2
(45) Date of Patent: Oct. 7, 2008

(54) METHOD AND APPARATUS FOR PRODUCTION OF PLASTER PLATES HAVING 4 TAPERED EDGES

(75) Inventor: Michel Capron, Hochstatt (FR)

(73) Assignee: Lafarge Platres, Avignon, Cedex (FR)

( * ) Notice: Subject to any disclaimer, the term of this patent is extended or adjusted under 35 U.S.C. 154(b) by 510 days.

(21) Appl. No.: 10/510,444

(22) PCT Filed: Apr. 9, 2003

(86) PCT No.: PCT/FR03/01118

§ 371 (c)(1), (2), (4) Date: May 3, 2005

(87) PCT Pub. No.: WO03/084724

PCT Pub. Date: Oct. 16, 2003

(65) Prior Publication Data

US 2005/0224154 A1 Oct. 13, 2005

(30) Foreign Application Priority Data

Apr. 10, 2002 (FR) .................................. 02 04479

(51) Int. Cl.
*B32B 37/14* (2006.01)
*B32B 38/06* (2006.01)

(52) U.S. Cl. ........................... 156/44; 156/45; 156/209; 156/247; 156/265; 156/347; 156/348; 156/519; 156/520; 156/553

(58) Field of Classification Search .................. 156/39, 156/40, 44, 45, 346–348, 247, 265, 209, 156/519, 520, 553
See application file for complete search history.

(56) References Cited

U.S. PATENT DOCUMENTS 1,383,255 A * 6/1921 Birdsey ....................... 156/40
1,439,289 A 12/1922 Buttress
1,559,257 A * 10/1925 Klein et al. ................. 156/519
1,568,314 A * 1/1926 Buttress et al. ............... 156/44
1,676,318 A 7/1928 Birdsey (Continued)

FOREIGN PATENT DOCUMENTS

CA 1 204 279 A 5/1986

(Continued)

OTHER PUBLICATIONS

Chinese Office Action (English translation only),—no date.

(Continued)

*Primary Examiner*—Steven D Maki
(74) *Attorney, Agent, or Firm*—Buchanan Ingersoll & Rooney PC

(57) ABSTRACT

A method for producing plaster plates (44), according to which two fine cardboard-covered sheets of paper (8, 9) enclose a plaster-based hydraulic binder (10) in a shaping device (13), creating a composite band (45) that is hardened on one or several hardening bands (14, 15), the edges of said hardening bands (14, 15) being provided with two bands used for tapering in the horizontal direction.

12 Claims, 5 Drawing Sheets

U.S. PATENT DOCUMENTS

| | | | | |
|---|---|---|---|---|
| 1,754,429 | A | 4/1930 | Knode | |
| 1,856,932 | A | 5/1932 | Shaw | |
| 1,856,936 | A | 5/1932 | Turner | |
| 1,871,563 | A | 8/1932 | Ericson | |
| 2,044,234 | A | 6/1936 | Walper | |
| 2,168,803 | A | 8/1939 | Page | |
| 2,238,017 | A | 4/1941 | Duncan | |
| 2,246,987 | A | 6/1941 | Roos | |
| 2,537,509 | A | 1/1951 | Camp | |
| 2,600,322 | A * | 6/1952 | Raney | 156/519 |
| 2,712,169 | A | 7/1955 | Buttress | |
| 2,991,824 | A | 7/1961 | Loechl | |
| 2,991,825 | A | 7/1961 | Hampson | |
| 2,991,826 | A | 7/1961 | Armstrong | |
| 3,050,104 | A | 8/1962 | Burt | |
| 3,108,028 | A * | 10/1963 | Sprunck et al. | 156/178 |
| 3,158,522 | A * | 11/1964 | Dreher | 156/519 |
| 3,233,301 | A * | 2/1966 | Tillisch et al. | 156/348 |
| 3,373,065 | A | 3/1968 | Gutzman et al. | |
| 3,469,361 | A * | 9/1969 | Winkowski | 156/39 |
| 4,397,123 | A | 8/1983 | Parker | |
| 4,450,022 | A * | 5/1984 | Galer | 156/346 |
| 4,626,389 | A | 12/1986 | Lempfer et al. | |
| 4,781,558 | A | 11/1988 | Betzner | |
| 4,987,940 | A * | 1/1991 | Straub et al. | 156/519 |
| 5,198,052 | A * | 3/1993 | Ali | 156/347 |
| 5,200,020 | A * | 4/1993 | Collins et al. | 156/519 |
| 5,842,280 | A | 12/1998 | Robell | |
| 5,851,634 | A | 12/1998 | Andersen et al. | |
| 5,975,280 | A | 11/1999 | Cote et al. | |
| 6,342,284 | B1 | 1/2002 | Yu et al. | |
| 7,033,431 | B2 | 4/2006 | Martin et al. | |
| 2001/0044016 | A1 | 11/2001 | Watras | |
| 2003/0084633 | A1 | 5/2003 | Zuber et al. | |
| 2003/0175478 | A1 | 9/2003 | Leclecq | |
| 2003/0217799 | A1 | 11/2003 | Falinower | |
| 2004/0007307 | A1 | 1/2004 | Falinower | |
| 2005/0127545 | A1 | 6/2005 | Jallon et al. | |
| 2005/0139052 | A1 | 6/2005 | Jallon et al. | |
| 2005/0224154 | A1 | 10/2005 | Capron | |
| 2005/0257873 | A1 | 11/2005 | Arese et al. | |
| 2006/0144497 | A1 * | 7/2006 | Capron | 156/348 |
| 2006/0198989 | A1 | 9/2006 | Jallon et al. | |

FOREIGN PATENT DOCUMENTS

| | | | |
|---|---|---|---|
| CA | 2147118 | A1 | 5/1994 |
| CL | 1804-98 | | 1/1998 |
| DE | 872 025 | | 3/1953 |
| DE | 2 325 158 | | 12/1974 |
| DE | 36 34 533 | A1 | 4/1988 |
| DE | 42 09 594 | A1 | 9/1993 |
| EP | 0 482 810 | A1 | 4/1992 |
| EP | 1 143 084 | A2 | 10/2001 |
| EP | 1 338 393 | A1 | 8/2003 |
| EP | 1 361 030 | A1 | 11/2003 |
| FR | 2 448 422 | | 9/1980 |
| GB | 429084 | | 5/1935 |
| GB | 429379 | | 5/1935 |
| GB | 429380 | | 5/1935 |
| GB | 451389 | | 8/1936 |
| GB | 2 050 917 | A | 1/1981 |
| GB | 2 221 181 | A | 1/1990 |
| JP | 53-51227 | | 5/1978 |
| JP | 2000-288979 | A | 10/2000 |
| SU | 285113 | | 5/1971 |
| SU | 787173 | | 12/1980 |
| SU | 1476505 | A1 | 4/1989 |
| WO | 94/27001 | A1 | 11/1994 |
| WO | 02/068197 | A1 | 9/2002 |
| WO | 03/072326 | A2 | 9/2003 |
| WO | 03/084724 | A1 | 10/2003 |
| WO | 03/092976 | A1 | 11/2003 |
| WO | 2004/009309 | A2 | 1/2004 |
| WO | 2004/030879 | A2 | 4/2004 |

OTHER PUBLICATIONS

European Search Report dated Dec. 5, 2006 (with English translation of category of cited documents).

Russian Federation Office Action dated Feb. 25, 2003 (English translation only).

* cited by examiner e
L
l
5
8

9
10
5
8

R
51
8

9
10
51
8

Ø...
52
8

9
10
52
8

11
12
11
53

9
10
11
12
53
12
11

54

55

55

56

56

11
12
11

57
59

58
57

METHOD AND APPARATUS FOR PRODUCTION OF PLASTER PLATES HAVING 4 TAPERED EDGES

BACKGROUND OF THE INVENTION

The present invention relates to a method and apparatus for producing plasterboard with four tapered edges at the outer edge of each board.

The invention is in the field of continuous plasterboard production in which two sheets of cardboard-type paper, the lower one of which, because of its color is called the cream or facing paper (hereinafter the facing paper) and the other upper one being called the gray or backing paper are unrolled and come to enclose a plaster-based hydraulic binder inside a shaping means in the form of shaping plates or shaping rollers.

These two sheets of paper constitute, with the hydraulic binder, a composite strip which generally hardens on two hardening belts at the edges of which two narrow taper reservation strips are present allowing the future board to be provided with longitudinal tapered edges.

This composite strip is cut to the desired length, passed through the drying oven and is finally recut to its definitive length before being stacked. Such a method is well-known and will not be described further in detail in this specification.

The value of having tapered edges all around plasterboard has been known and appreciated for many years. Indeed, they facilitate the abutment and jointing of plasterboard and allow large surface area constructions to be built with excellent flatness characteristics and mechanical strength.

For many years now, it is known how to produce plasterboard with tapered longitudinal edges on continuous manufacturing lines but there is no method allowing production, on such continuous operating lines, of plasterboard with transverse tapered edges having the same characteristics as the longitudinal tapered edges.

There have obviously been numerous attempts and numerous patents have been taken out, essentially US patents, attempting to resolve this problem of continuous production of tapered transverse edges. U.S. Pat. No. 2,238,017 in particular attempted, in 1941, to create excess thickness by bending of cardboard but this invention never went into industrial development probably because the bending did not withstand the tension in the paper or the weight of the hydraulic binder. U.S. Pat. No. 2,991,825 attempted, 20 years later, to make imprints in a shaping roller system but this was not followed up by Industrial development certainly because the imprint generated got wiped out by crushing on the hardening belt.

It must be recognized that currently, plasterboard with tapered transverse edges if boards do exist are either the result of machining of the edges called tapering or feathering or artifices such as grooving, pressing and bonding of the edge, or, more frequently, are provided by the artisan who simply planes the edge of the board to provide a transverse taper.

The solutions are all expensive and impact on the production cost of the board with, additionally, the taper being far from having the qualities of the longitudinal taper. There is currently a real need on the market and a real call from the industry regarding this situation.

SUMMARY OF THE INVENTION

The method and apparatus according to the invention allow these disadvantages to be overcome.

A solution to the problem posed is, according to this present invention, in a production line of the type discussed above, a method consisting in:

- continuously preparing expandable, flexible, lightweight spacers or packing pieces,
- cutting said packing pieces to a length equal to a width of the plasterboard being produced less a value comprised between 0 and 10 cm,
- applying adhesive to an upper face of said packing pieces,
- continuously bonding said packing pieces on-the-fly to the bottom of one of said cardboard-type paper sheets transversely thereto, centered, and perpendicular to a direction of advancement of said paper sheet at accurate regular intervals “p”,
- bonding said packing pieces to said paper sheet in a region ahead of said shaping means,
- allowing said packing pieces to be carried along by said paper sheet,
- adjusting a tension in said paper sheet so as to regulate a width of an imprint created therein,
- leaving said packing pieces fastened to said paper sheet for the time needed to pass through said shaping means and the time needed for the composite strip composed of said paper sheets and the hydraulic binder to harden,
- cutting the composite strip with knife means in the middle of the imprints left by said packing pieces.

The result is a new method and apparatus for production which corresponds well to the requirements of the problem posed, the transverse taper resulting from the imprints having surface, appearance, and strength characteristics identical to those of the longitudinal taper and been produced using a continuous process which has proved to be very low cost and useful for industrialists and the plasterboard market.

The description and drawings below show one example of the production of plaster-based paper-faced board showing the particular advantages of the invention like those mentioned above, but have no limiting character: other production is possible in the framework of the scope of the invention, in particular the production of plasterboard using inorganic material-based papers or glass mat in place of paper or cardboard or yet again, more generally, production of board using two sheets or a casing regardless of its nature, enclosing, after passage through a shaping means, a hydraulic binder that sets or dries.

DETAILED DESCRIPTION OF PREFERRED EMBODIMENTS

Figures 1A, 1B:
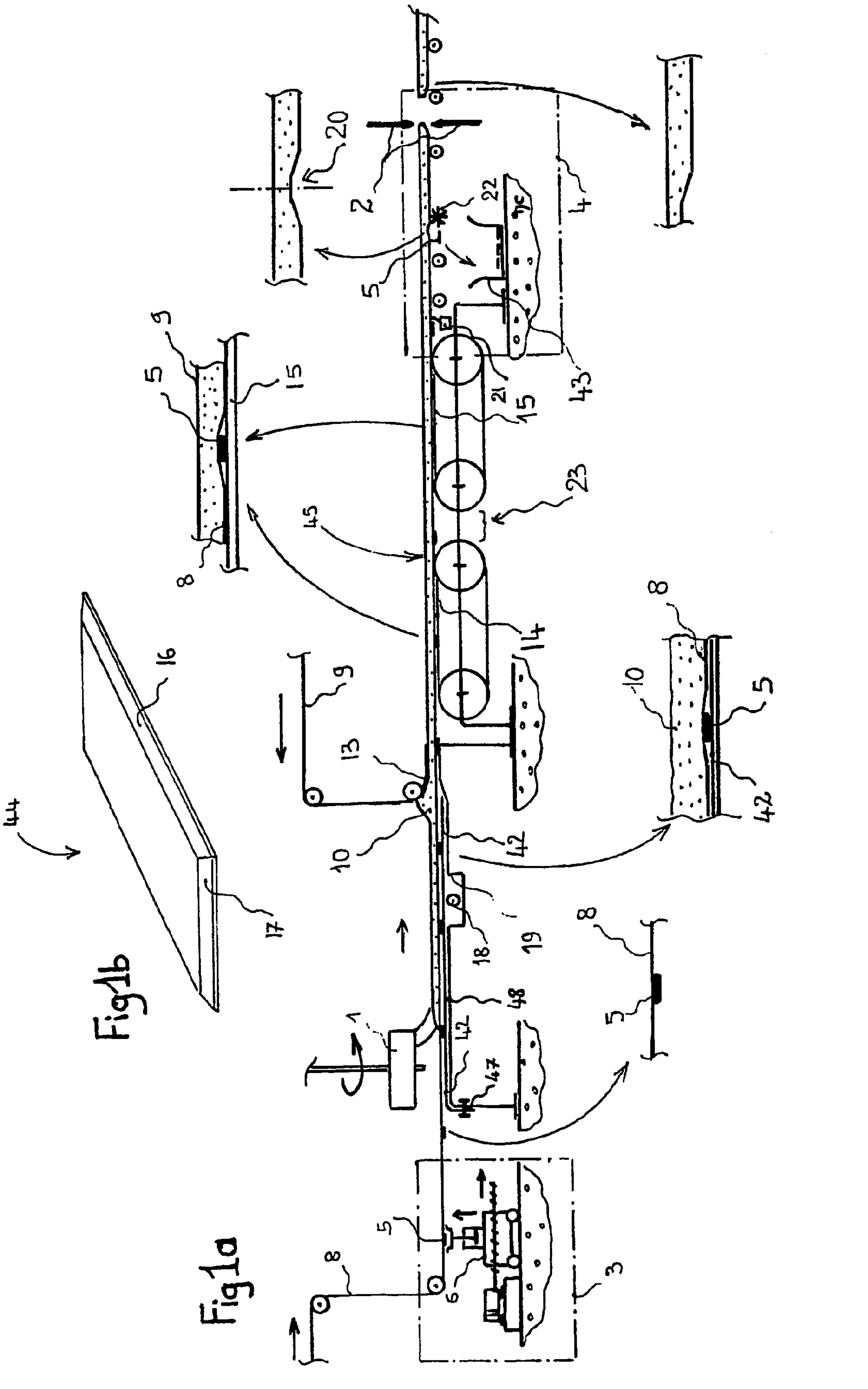
FIG. 1*a* shows the production line head in which the new method of the invention is implemented.
FIG. 1*b* shows a board with four tapered edges produced according to the invention.

The method of the invention consists, firstly, in the continuous preparation at a high production rate of the packing pieces or spacers 5. These packing pieces 5 come from an inexpensive, lightweight flexible expandable material; they are between 1 and 2 mm thick and between 5 and 20 mm wide with their length being equal to the width of the board in the process of production less a value of between 0 and 10 cm.

These packing pieces 5 are removed from a roll 26 of flexible strip 27, cut to length and carrying a layer of adhesive on their upper face.

In one embodiment of the method, the packing pieces 5 are of a material having the same expansion when moist as the facing paper 8 to which they are fastened. They can for example be a packing piece of paper of the same nature as the facing paper 8, so that the composite strip 45 can expand freely without being retained by the packing piece 5 while hardening.

According to an embodiment of the method, the packing pieces 5 are subjected to a certain number of machining operations to improve their useability such as:

- a shaped or tapering cut at the ends of the packing piece 5 to control the future shaping of the ends of the tapered transverse edge 17.
- a thinning down of the ends to also improve the future shaping of the ends of the transverse taper 17.
- flattening or rounding of the sharp edge of the flexible strip 27 to give a rounded packing piece 51 which is less likely to get caught up during its future movement within the mixer 1 and shaping means 13 region.

The method of the invention next consists in bonding the packing pieces 5 underneath the facing paper 8 in a region which of necessity is prior to the shaping means 13, meaning that it can be between the mixer 1 and the shaping means 13 or yet again, between the mixer 1 and the roll of facing paper 8 and is, according to the invention preferably just in front of the mixer 1.

The bonding of the previously prepared packing pieces 5 below the facing paper 8 is, according to the method of the invention, an operation which is done on-the-fly, continuously, and at high frequency. The packing pieces 5 are positioned perfectly centered and quite perpendicular to the direction of advancement of the facing paper 8.

They are fastened to the facing paper 8 at intervals between them calculated, taking account of the longitudinal expansion of the composite strip 45 while it is setting, so as to correspond to the expected final length of the plasterboard 44 after it has dried allowing for the excess length necessary for sawing the plasterboard 44 when it leaves the production line, such calculation being well known to those skilled in the art.

The landing means implemented for bonding the packing pieces 5 on-the-fly are arranged so that the facing paper 8 undergoes no deviation nor deformation which could be prejudicial to the correct manufacture of the plasterboard 44.

According to the invention, one method adopted for bonding the packing pieces 5 is adhesive bonding, the bonding parameters being controlled to ensure the packing piece 5 fastened to the facing paper 8 by adhesive bonding does not interfere with the expansion thereof perpendicular to this bonding. The parameters that are adjusted are the following:

- the choice of adhesive bonding by dipping or spraying,
- the amount of adhesive 24 deposited and the distribution of the adhesive 24 over the packing piece 5,
- the discontinuity or continuity of the adhesive film 24 over the packing piece 5,
- the elasticity and tack characteristics of the adhesive 24.

In one embodiment, the means used for introducing and bonding the packing pieces 5 on-the-fly additionally serve to roughen the facing paper 8 at both sides of a packing piece 5; this can be done by stamping, knurling, pricking, brushing and so on. Thus, the region corresponding to the future transverse tapering 17 will be better keyed to the jointing product, and the mechanical strength of the connection between plasterboard elements 44 will then be greatly improved.

In one embodiment, the means used for bonding the packing pieces 5 on-the-fly also serve to pre-mark the facing paper 8 with two notch lines 11 parallel to packing piece 5 and at a distance of between 5 and 9 cm from the axis of the packing piece 5. Pre-marking of the facing paper 8 in a region which will later constitute the beginning of the transverse tapering 17 will improve the configuration and appearance, these notch lines 11 delimiting the rough surface 12.

The method then consists in protecting the packing pieces 5 carried on the facing paper 8 against accidentally being torn off through the action of mechanical parts present between the mixer 1 and the shaping means 13, and for this, in this region, all the points of engagement and all projecting points 19 are removed or rounded off.

According to an embodiment, to facilitate the passage of the packing pieces 5 through the region between the mixer and shaping means 13, a flexible, slippery and wear-resistant guide sheet 42 is placed between the mixer 1 and the entry to the shaping means 13, this guide sheet 42, which is wider than the length of packing pieces 5, is secured at its upstream end by securing means 47 and it is then left free, this guide sheet 42 covering all the tooling means present in the region such as the table 48, the beaters 18, the facing paper guides 8, without interfering with their effectiveness. The guide sheet 42 ensures perfect sliding of the packing pieces 5 so they cross the region between the mixer 1 and shaping means 13.

The method then consists in allowing the packing pieces 5 to firstly pass through the shaping means 13 but also in waiting for a period of time sufficient for the composite strip 45 to harden so that the imprint 20 left by the packing pieces 5 at the facing paper side 8 of composite strip 45 is permanent and definitive.

The method then consists in stripping off the packing pieces 5 on-the-fly and discharging them to waste 43, unbending being able to be done at any point where the above-mentioned hardening time is sufficient. This is preferably the region 23 between the two hardening belts 14 and 15 or just ahead of the shear 2.

Stripping off consists in removing the packing piece 5 with a brush 22 which, after removing a packing piece 5, is retracted so as to not interfere with the facing paper surface 8. This brush 22 is inclined with respect to the line so that brush 22 is more effective in breaking the bond of the packing piece 5. Removal is all the more easy as, the facing paper 8 at this stage in the method, becoming moist, little energy is required to remove the packing piece 5.

According to an alternative embodiment of the method, the packing pieces 5 are removed using jets of compressed air or yet again by burning the packing piece 5 with suitable burners.

According to another alternative embodiment, the packing pieces 5 are not removed and then remain bonded to the composite strip 45, their low mechanical strength allowing them to be readily cut by a single knife stroke at right angles thereto, said packing pieces 5 then continuing their circuit to be destroyed by sawing at the end of the plasterboard line. Nevertheless, the method provides for weakening of the packing piece 5 at its main axis. For this, it can be the flexible strip 27 which is appropriately designed or it can also be a tool which weakens the flexible strip 27 along its main axis while the packing pieces 5 are being prepared.

The last stage in the method consists in cutting the composite strip 45 with a knife or shear 2 at the imprints 20 left by packing pieces 5. The imprints 20 are between 10 and 18 cm wide, in other words several times greater than the width of packing piece 5.

The result, at this stage in the method is a plasterboard element 44 with four tapered edges at its periphery, the two longitudinal ones 16 being conventional and the transverse ones 17 having been created by the method of the invention. The plasterboard 44 then passes through the drier, is sawn to length and then stacked to be stored.

According to an embodiment, the knife or shear 2 stroke takes place simultaneously in the imprints 20 and at a distance equal to that of two imprints 20, the board elements 44 thus produced having three tapered edges, two longitudinal ones 16 and a single transverse one 17. Such board elements with three tapered edges are useful for some particular applications in the market.

According to the invention, the exact shape and dimensions of the packing piece 5, the notch lines 11, the packing piece end shaping operations discussed above and of the adjustment of the tension in the facing paper 8 allow the shape of the imprint 20 to be controlled along with its width of between 10 and 18 cm; indeed, these parameters all influence the shape and dimension of the imprint 20 left by the packing piece 5.

According to one alternative embodiment, the packing pieces 5 are reduced to a single wire or even 2 wires of some few $mm^2$ cross section. The wires are circular or square, the usefulness of the wire being that it is readily put into a roll and his very inexpensive, so the method has available to it single wire packing pieces 52 and double wire packing pieces 55.

According to one alternative embodiment, the packing pieces 5 are extracted from a flexible strip 27 still between 5 and 20 mm wide but with a thickness reduced to a few tenths of a mm thus being more economical and advantageous for the method. To artificially increase the thickness of the packing piece 5 cut in the flexible strip 27 which is quite thin, this increase in thickness being necessary for the method of the invention, small holes are pricked in it over its length by at least one row of pins. The pricking operation 58 locally raises the material of the flexible strip 27, pushing it up, see reference 59, and thereby artificially increasing the thickness of the flexible strip 27 and this method gives a pricked packing piece 57 which is highly economical. In one embodiment, the pricked packing piece 57 is pricked over one or several lengths. According to another embodiment, the ends of the pricked packing piece 57 are pricked with a chosen depth and progressiveness, thereby having better control of the shaping of the region of intersection between the transverse tapering 17 and the longitudinal one 16.

In the method, the packing pieces 5 are made from one of the following materials, paper, plastic material, organic material, metal, or composite material.

According to one alternative embodiment, the packing piece 5 takes the form of one or two heat-bonded plastic wires. The advantage here is that of having a material that avoids the stage of adhesive bonding the packing piece 5, being as it were a two-in-one packing piece 56.

In one alternative embodiment, the packing pieces 5 come from a readily consumable material such as paper, so that they can be burnt prior to shearing 2, to remove them from composite strip 45; the other advantage of this embodiment is that it avoids having to get rid of the packing pieces after use.

In another alternative embodiment, the packing pieces 5 come from a roll 26 of self-adhesive tape which has the advantage of good regularity of bonding of the packing piece 5 to the facing paper 8 allowing the adhesive applying means 30 or 60 to be dispensed with.

According to yet a further embodiment, advantage is taken of contacting the facing paper 8 either with a linearly moving bonding follower 6 or a rotary bonding follower 7 for marking the transverse tapers with an ink jet printing system. Thus, this new transverse tapering 17 can be highlighted and made more evident.

Figure 2:
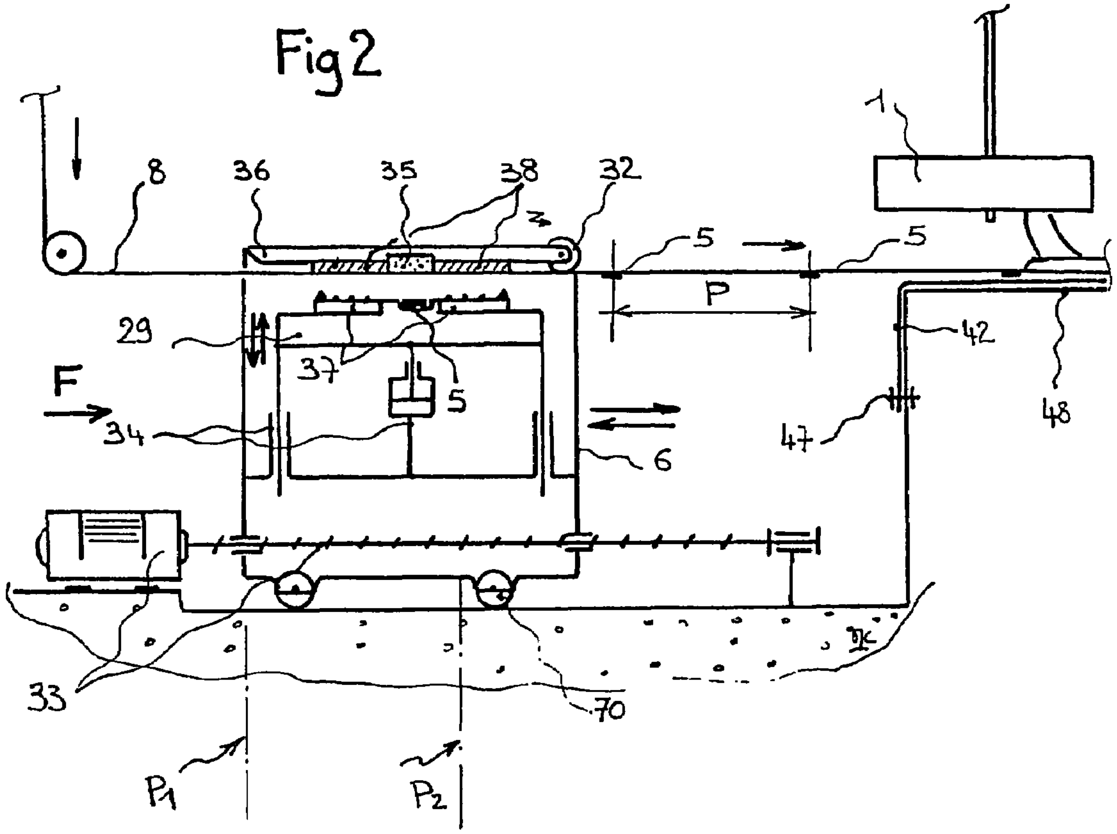
FIG. 2 shows the apparatus according to the invention for preparing, positioning and bonding packing pieces or spacers on the facing paper.
Figure 3:
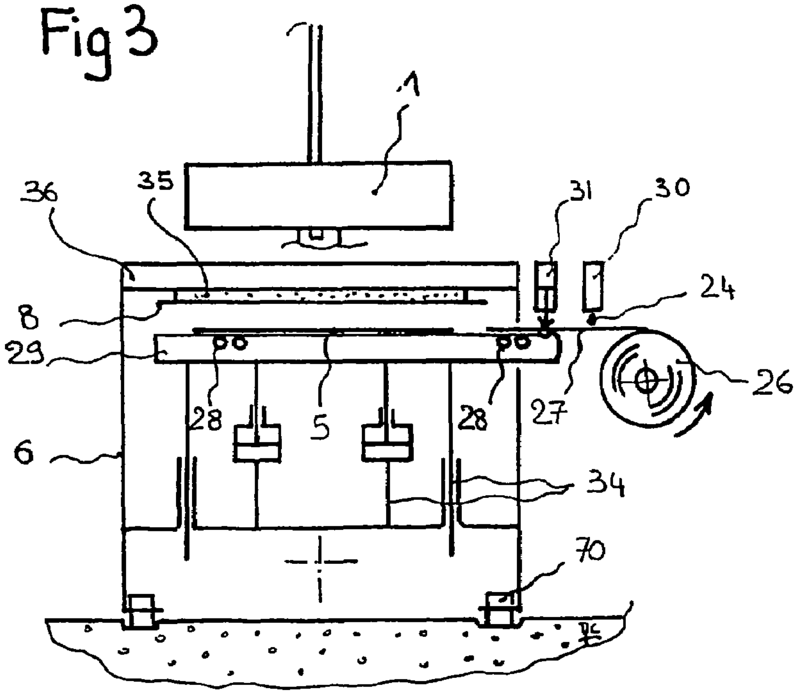
FIG. 3 is a view in the direction of arrow F of the apparatus in FIG. 2.

The linearly moving bonding follower 6 associated with the method of the invention shown inside the dash-dot line rectangle 3 of FIG. 1*a* details of which are given in FIGS. 2 and 3, proceeds with all steps from preparation of the packing pieces 5 right up to their bonding below the facing paper 8.

At the beginning of the process, we find a roll 26 of flexible strip 27 of about 1.5 by 10 mm section. This roll 26, which is driven and transported by small rollers 28 engages flexible strip 27 on lower table 29 perpendicularly to the direction of unwinding of the facing paper 8, said lower table 29 being underneath and at a certain distance from the facing paper 8. The flexible strip 27 is covered while it moves towards lower table 29 with a very thin film of adhesive 24 by the adhesive applying means 30, this flexible strip 27 then being cut to length by knife 31 to become a packing piece 5. This packing piece 5 is consequently positioned perpendicularly to the direction of unwinding of the facing paper 8 at a distance from and below the latter, and centered with respect thereto by the small rollers 28 and their associated position detector.

The lower table 29 which is part of the linearly moving bonding follower 6 is set in motion at the same speed as facing paper 8 by means of carriage 70, said carriage 70 being driven by drive transmission means 33 associated with an electronic system and pulse sensor 32. The pulse sensor 32 which is stationary with respect to the linearly moving bonding follower 6 is permanently aware of the position of the packing pieces 5 with respect to facing paper 8. Lower table 29 is now moving with the same speed as facing paper 8 and at this very precise moment, lower table 29 performs an up-and-down movement on jacking and guide means 34, compressing and bonding the packing piece 5 beneath the facing paper 8, said facing paper 8 then being supported by abutment against compressible abutment plate 36 itself fixed to the upper counter-table 36. Packing piece 5 thus fastened on-the-fly is carried along by the facing paper 8 without having modified or disturbed the movement thereof. The linearly moving bonding follower 6 at position "P2" during bonding of the packing piece 5 now returns to its starting position "P1". A new positioning and bonding of packing piece 5 cycle starts, with a new packing piece 5 being bonded while respecting a precise interval "P" with respect to the preceding packing piece 5, and thus the cycle repeats over again.

This interval "P" depends on the length of plasterboard element 44 required, on the longitudinal expansion of composite strip 45 while it is hardening on the hardening belts, and on the excess length necessary for sawing plasterboard elements 44 at the end of the line. This gap is readily calculated by the person skilled in the art and is adhered to using pulse counter 32, suitable electronics and drive and transmission means 33.

According to one embodiment, the sharp edges of packing pieces 5 are rounded off, their ends are chamfered and tapered. This is performed by tool means in line with the adhesive applying means 30 and the shear or knife 31, responsible for machining the flexible strip 27 at the time of its passage and engagement on lower table 29.

Figures 7, 8, 9, 10, 11, 12, 13, 14, 15, 16, 17, 18, 19, 20, 21, 22:
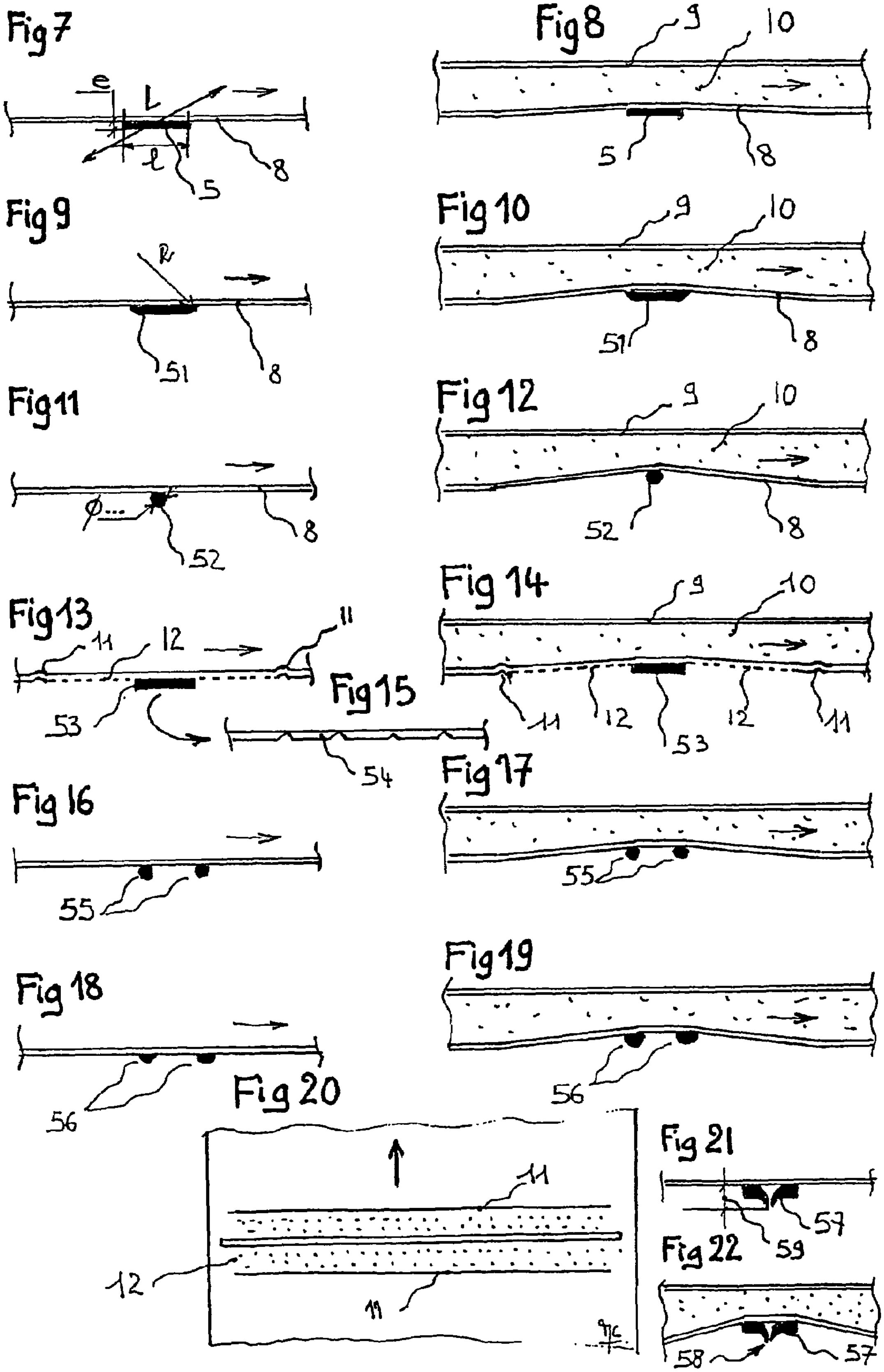
FIG. 7 shows the packing piece bonded below the facing paper according to the invention.
FIG. 8 shows the bonded packing piece of FIG. 7 after going through the shaping means of the invention.
FIG. 9 shows, according to the invention, a first alternative embodiment of a packing piece bonded below the facing paper.
FIG. 10 shows the packing piece as bonded in FIG. 9, after passing through the shaping means.
FIG. 11 shows a second alternative embodiment of a packing piece bonded below the facing paper.
FIG. 12 shows the bonded packing piece of FIG. 11 after passing through the shaping means.
FIG. 13 shows a third alternative embodiment of a bonded packing piece below the facing paper.
FIG. 14 shows the bonded packing piece of FIG. 13 after passing through the shaping means.
FIG. 15 shows a fourth alternative embodiment of packing piece 5.
FIG. 16 shows a fifth embodiment of a packing piece bonded below the facing paper.
FIG. 17 shows the bonded packing piece of FIG. 16 after passing through the shaping means.
FIG. 18 shows a sixth alternative embodiment of bonded packing piece below the facing paper.
FIG. 19 shows the bonded packing piece of FIG. 18 after passing through the shaping means.
FIG. 20 shows a bottom view of the facing paper after bonding the packing piece and stamping said paper according to the invention.
FIG. 21 shows a seventh alternative embodiment of bonded packing piece below the facing paper.
FIG. 22 shows the bonded packing piece of FIG. 21 after passing through the shaping means.

In one embodiment, a rough surface 12 and two notch lines 11 are created at each side of a packing piece 5. FIG. 20 shows more detail of how this rough surface 12 and notch lines 11 of facing paper 8 at each side of a packing piece 5 appear. The tool associated with this embodiment consists of a stamper 37 and counter-stamper 38 fixed to the upper counter-table 35 which, when the lower table 29 moves upwards, slightly stamps and consequently embosses, the facing paper 8.

In one embodiment, the flexible strip 27 a few tenths of a mm thick used for producing packing piece 5 is pricked along one or several lines in its longitudinal sense. The tool used here is in line with the adhesive applying means 30 and shear or knife 31. This tool has means for adjusting the depth of pricking. The adjustment allows regulation of the overall thickness or apparent thickness of the flexible strip 27 and consequently of the depth of the transverse tapering 27 being sought. The two ends of the packing piece 5 are pricked more strongly and progressively, to improve the profile of the point where a horizontal tapering 16 and transverse tapering 17 meet.

Figures 4, 5:
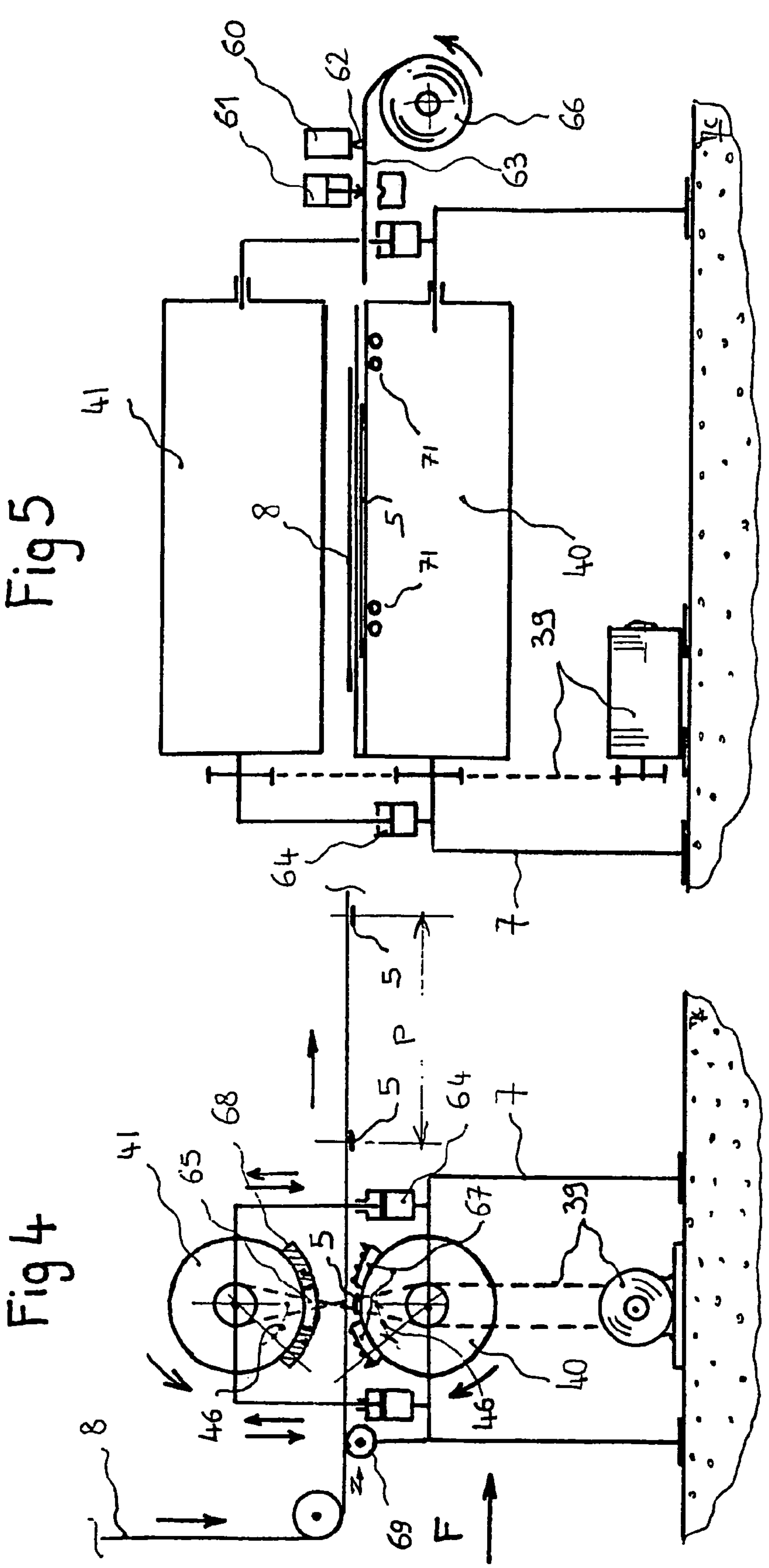
FIG. 4 is an alternative embodiment of the apparatus according to the invention for preparing, positioning and bonding the packing pieces onto the facing paper.
FIG. 5 is a view in the direction of arrow F of the apparatus in FIG. 4.
Figure 6:
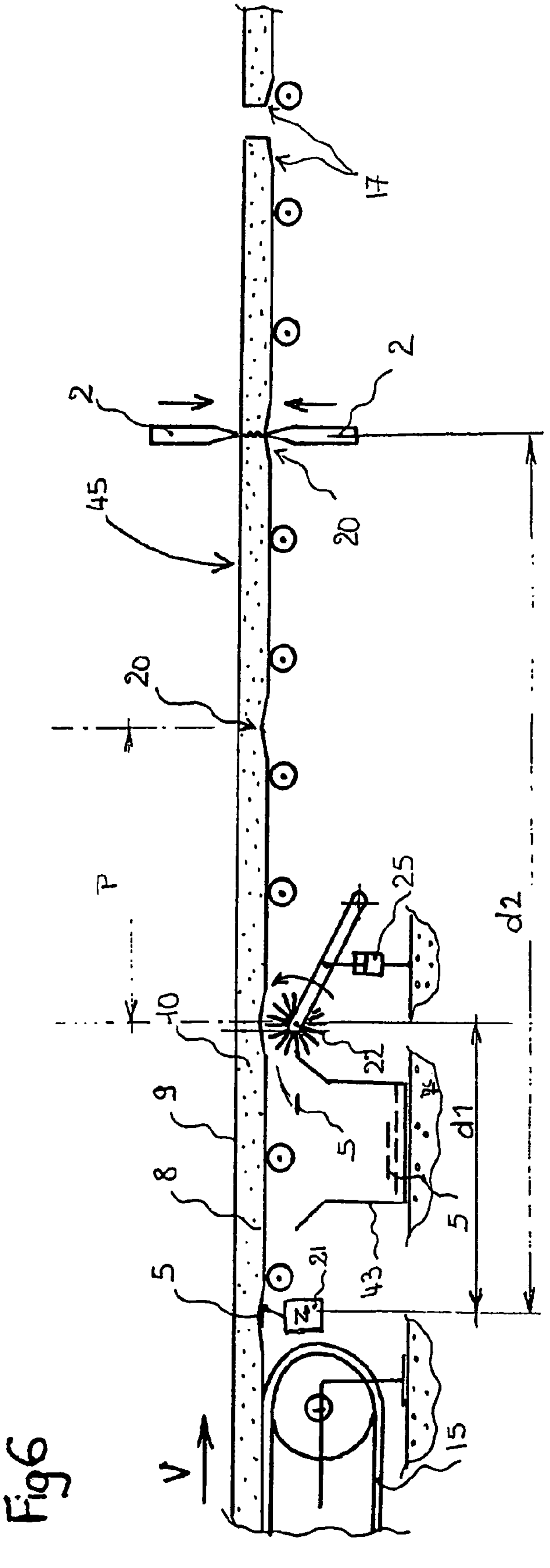
FIG. 6 shows the device of the invention for unbonding the packing pieces and cutting the composite strip.

In one embodiment, a rotary bonding follower 7 performs, just like the linearly moving bonding follower 6, the functions of preparing, positioning and bonding at a precise interval of the packing pieces 5 below the facing paper 8. FIGS. 4 and 5 show this rotary bonding follower device 7, and on FIGS. 4 and 5, there can be seen the lower roller 40 and upper roller 41, and the same pieces of apparatus will be seen on this rotary bonding follower 7 as those already seen on the linearly moving bonding follower 6, in other words: the roller 66, flexible strip 63, small roller 71, adhesive applying means 60, shear ron knife 61, pulse sensor 69, jacking means and guides 64, compressible abutment plate 65, stamper 67 and counter-stamper 68.

The preparation and positioning of the packing pieces 5 on the lower roller 40 is done similarly to the preparation of the packing pieces 5 on the linearly moving bonding follower 6. The rounding of the sharp edges of the packing pieces 5, their chamfering and end tapering is also done in analogous fashion to that used for packing piece preparation on the linearly moving bonding follower 6.

The essential difference between this rotary bonding follower 7 and the linearly moving bonding follower 6 resides in the manner of approach to the facing paper 8, the bonding of the packing piece 5, and the stamping of the facing paper 8. These are described below.

A packing piece 5 is prepared, it is below facing paper 8 and spaced therefrom, and makes a rear angle 46 with the facing paper 8.

By means of pulse sensor 32, and suitable electronics, lower roller 40 and upper roller 41 driven by motor and transmission means 39 adopt the same peripheral speed as the horizontal speed of the facing paper 8 during angular movement equal to the rear angle 46, at the precise instant where packing piece 5 and compressible abutment plate 65 are in the position shown in FIG. 4, the jacking means and guides 64 receive a command to lower and raise the upper roller 41 thereby bonding the packing piece 5 underneath the facing paper 8. The packing piece 5, thus bonded on-the-fly, is carried along by the facing paper 8 without having modified or disturbed the movement of the facing paper 8.

The upper 40 and lower 41 rollers then move back at angle 46 and a new preparation, positioning and bonding cycle starts, a new packing piece 5 being bonded while respecting a precise interval "P" with the preceding packing piece 5, and the cycle repeats over again in this way.

How this interval "P" is calculated was explained above. This is something the skilled person is perfectly able to calculate and which is adhered to in practice by pulse sensor 69, suitable electronics and motor and transmission means 39.

At the moment of bonding, stamper 67 and counter-stamper 68 slightly emboss the facing paper 8 to obtain a rough surface 12 and the two notch lines 11, as discussed above: the rough surface will coincide with the transverse tapering 17 and the notch lines 11 will coincide with the line where the transverse tapering 17 starts.

One embodiment of the device involves facilitating the passage of the packing pieces 5 and their sliding within the region between the mixer 1 and shaper 13. This involves the use of a flexible guide sheet 42 which is slippery and wear resistant, this latter wear resistance characteristic being essential as the guide sheet 42 will have the facing paper 8 and all packing pieces 5 passing over it. Said guide sheet 42, which is wider than the length of the packing pieces 5, is held by fasting means 47 upstream of the mixer 1 and shaping means 13 region, and is centered with respect to the movement of the facing paper 8 and consequently the packing pieces 5, the guide sheet covering all the areas of friction and possible snagging in the region between mixer 1 and the start of shaping means 13.

This guide sheet 42 covers the table 48, the beaters 18, projecting points 19, guides for the facing paper 8 and thus protects the packing pieces against any risk of becoming detached in this region.

Last, means are provided for stripping off the packing pieces 52 to discharge them to waste 43. This is a brush 22 which rotates permanently and which is inclined with respect to the line. This brush is operated by the jacking means 25 which raise the brush 22 only when packing pieces 5 are passing. The jacking means 25 are controlled by the detector for imprints 21 and its associated electronic system which calculates the point in time at which the jack should be raised depending on the distance d1 between the imprint detector 21 and the brush 22, and the speed "V" at which the composite strip 45 is moving.

The stroke of the shear or knife 2 in alignment with imprint 20 left by packing piece 5 is controlled by imprint detector 21 and associated electronics which take account firstly of a distance d2 between imprint detector 21 and shear or knife 2, and, secondly, the speed "V" at which the composite strip 45 is moving.

The invention claimed is:

1. A method for continuous production of plasterboard elements in which two cardboard-type paper sheets enclose, within shaping means, a plaster-based hydraulic binder to create a composite strip which then hardens on two hardening belts carrying at their edges two tapered strips for producing longitudinal tapered edges thereon, comprising:

- continuously preparing flexible, lightweight spacers or packing pieces between 1 and 2 mm thick and 5 to 20 mm wide,
- cutting said packing pieces to a length equal to a width of the plasterboard being produced less a value comprised between 0 and 10 cm,
- applying adhesive to an upper face of said packing pieces,
- continuously bonding said packing pieces on-the-fly to the bottom of one of said cardboard-type paper sheets transversely thereto, centered, and perpendicular to a direction of advancement of said paper sheet at accurate regular intervals, wherein during said bonding step, said packing pieces are bonded to said paper sheet in a region ahead of said shaping means,
- allowing said packing pieces to be carried along by said paper sheet,
- adjusting a tension in said paper sheet so as to regulate a width of an imprint created therein by the packing pieces to between 10 and 18 cm,
- leaving said packing pieces fastened to said paper sheet for the time needed to pass through said shaping means and the time needed for the composite strip composed of said paper sheets and the hydraulic binder to harden, and
- cutting the composite strip with knife means in the middle of the imprints left by said packing pieces.

2. The method according to claim 1, wherein said packing pieces are stripped off on-the-fly after said composite strip has hardened in a region extending from an end of a hardening belt to said knife means, and preferably in a region located between hardening belts immediately following one hardening belt, or in a region located close to and ahead of said knife means.

3. The method according to claim 1, wherein said packing pieces are cut from a roll of flexible strip which is of paper, plastic material, organic material, metal or composite material.

4. The method according to claim 3, wherein a pricked packing piece taken from a roll of flexible strip is pricked over its length along at least one line of pins of variable length allowing control of the overall thickness of a pricked packing piece and consequently of the depth of the transverse tapering being sought, the ends of a pricked packing piece being themselves pricked to a depth different to said height of said pins at a mid-point of said pricked packing piece.

5. The method according to claim 1, wherein said packing piece is reduced to a wire packing piece or a double wire packing piece, said wire originating from a roll of flexible wire either of paper, plastic material, synthetic material, organic material, composite material, or metal.

6. The method according to claim 1, wherein a surface of said paper sheet on the same side as said packing piece and at both sides of said packing piece and in coincidence with a future transverse tapering created by said packing piece is roughened either by stamping, pricking, knurling, brushing, said surface being additionally pre-marked along two notch lines parallel to said packing piece in a region corresponding to at future beginning of a said transverse taper created by said packing piece.

7. Apparatus for carrying out a method in which two sheets of cardboard-type paper are unwound and come to enclose a plaster-based hydraulic binder in shaping means to constitute a composite strip which hardens on two hardening belts fitted with tapered strips for creating horizontal tapers in a plasterboard production line in which the apparatus further comprises:

- a bonder follower device located in a region ahead of said shaping means provided for preparing said packing pieces from a roll of flexible strip, for coming into contact at high frequency with one of said paper sheets for accurately bonding on-the-fly said packing pieces to the bottom of said paper sheet for roughening and pre-marking said paper sheet at both sides of a packing piece bonded to the bottom of the one said paper sheet,
- a guide sheet located between said binder follower device and said shaping means provided to protect said packing pieces against being torn off, and for facilitating the passage and sliding of said packing pieces between said bonder follower device and said shaping means,
- packing piece removing means located after a hardening belt and ahead of cutting means provided for removing on-the-fly packing pieces bonded to the bottom of said composite strip, and
- cutting means located after a said hardening belt and after said packing piece removing means provided for cutting said composite strip in alignment with each of a number of imprints created by said packing pieces.

8. The apparatus according to claim 7, wherein the bonding follower device is a linearly moving bonding follower device constituted by a lower table located underneath one of said paper sheets and another counter-table situated above the said one of said paper sheets, said lower table receiving packing pieces originating from a roll of flexible strip and carrying adhesive applied by adhesive-applying means and cut to length by a knife and being provided with a stamper and jacking means and guides, said upper counter-table being fitted with a compressible abutment plate, and a counter-stamper, the two said tables being carried by a carriage moved by motor and transmission means.

9. The apparatus according to claim 7, wherein said bonding follower device is a rotary bonding follower device constituted by a lower roller located below said one paper sheet and an upper roller located above said one paper sheet, said lower roller receiving packing pieces originating from a roll of flexible strip and carrying adhesive applied by adhesive applying means and cut to length by a knife and being equipped at its periphery by a stamper, said upper roller located above said one paper sheet in parallel with said first lower roller being equipped at its periphery with a compressible abutment plate and a counter-stamper and being connected to jacking means and guides, the two said rollers being provided with motor and transmission means.

10. The apparatus according to claim 7, wherein a guide sheet thereof is constituted by a flexible, slippery and wear-resistant film, secured upstream of a table by fixing means, said flexible film, of greater width than a length of said packing pieces simultaneously embracing said table, beaters, projecting points, and guides for said one of said paper sheets in the region between a mixer and shaping means, said flexible film presenting to said packing pieces within said region a surface that is smooth, slippery and devoid of points where catching or snagging can occur.

11. The apparatus according to claim 7, wherein said means for removing packing pieces consists of jacking means controlled by an imprint detector and associated electronics, said jacking means being connected to a brush itself fitted with a motor, said brush being located below said composite strip and positioned so as to be inclined with respect thereto.

12. The apparatus according to claim 7, wherein said cutting means consist of a shear, an imprint detector at a known distance from said shear and shear stroke calculating means.

* * * * *